Patented Dec. 22, 1942

2,305,832

UNITED STATES PATENT OFFICE 2,305,832

PREPARATION OF SOLUTIONS OF MEDICAMENTS INSOLUBLE OR SPARINGLY SOLUBLE IN WATER

Werner Ursum, Frankfort-on-the-Main, Germany; vested in the Alien Property Custodian No Drawing. Application January 9, 1939, Serial No. 250,065. In Germany November 12, 1935

6 Claims. (Cl. 167—52)

The extraordinarily surprising observation, which was not at all expected, has been made that a mixture of medicinal substances has a quite substantially greater solubility in aqueous urethane solution than the single substance alone.

It has been attempted, by various more or less different additions to urethane solution, to increase its powers of dissolving and thereby obtain higher concentrations, but without obtaining one exceeding 10%. The doctor, however, needs for practical purposes solutions of much higher concentration.

It is possible according to the present method, to obtain solutions of 20% and more, so that for purposes of injection, a sufficient quantity of effective substances can be dissolved in a small volume. According to the present method, there is obtained not only the use in high concentrations, but also the increase in effect by a suitable combination.

The common medicinal substances used for the manufacture of the concentrated solutions may either work in the same direction and belong for example to the same class of substances, or have therapeutically different points of attack. Thus, undesired subsidiary effects by substances only increasing the solubility, are thus excluded.

The solutions thus obtained enable the easy application of a strongly acting dose, sufficient for each case. A special advantage of the present process is the fact that undesirable solvents not sufficiently definite or not definite in their effects may be avoided. There results, therefore, in the use of the solutions made in accordance with the invention no unknown reactions of any kind in the medical or clinical practice, since for the dissolution of the hypnotic solution only urethane (ester of carbonic acid) together with water is used.

The following examples show my invention without limiting it thereto:

Example 1

A mixture of

| | Parts by weight |
|---|---|
| Diethylbarbituric acid | 6 |
| Ethylurethane | 18 |
| Water | 6 | does not dissolve. This applies for

| | Parts by weight |
|---|---|
| Diallylbarbituric acid | 3 |
| Ethylurethane | 9 |
| Water | 3 |

If both mixtures are mixed together, there is quickly produced a clear and durable solution, which is also not influenced by heating.

The solution contains over 20% by weight of strong hypnotics, can be injected without irritation and results in a strong and lasting sleep.

Example 2

A mixture of

| | Parts by weight |
|---|---|
| Diethylbarbituric acid | 15 |
| Diethyltetrabromoethaneurea | 7 |
| Ethylurethane | 60 |
| Water | 18 |

A clear and durably remaining solution is the result, which may be sterilized. The sedative effect of this solution is emphasized.

Example 3

A 30% solution of various barbituric acid derivatives is obtained by mixing of:

| | Parts by weight |
|---|---|
| Diethylbarbituric acid | 10 |
| Diallylbarbituric acid | 10 |
| Phenylethylbarbituric acid | 10 |
| Ethylurethane | 54 |
| Water | 16 |

Rapid liquefying and solving takes place; the solution obtained may be sterilized and injected.

Example 4

| | Parts by weight |
|---|---|
| Diethylbarbituric acid | 15 |
| Chloral hydrate | 15 |
| Ethylurethane | 60 |
| Water | 10 | give a clear and durable solution.

Example 5

| | Parts by weight |
|---|---|
| 2-Phenylquinoline-4-methylcarboxylic acid | 10 |
| Urethane | 55 |
| Water | 15 | do not dissolve. With an addition of 20 parts by weight of camphor, there is produced a clear and durable solution.

I claim:

1. Method for the manufacture of durable concentrated solutions of organic medicinal substances not easily soluble in water using ethylurethane as a solvent, wherein at least two of the group containing diethylbarbituric acid, diallylbarbituric acid, diethyltetrabromoethanourea, and phenylethylbarbituric acid are dissolved in quantities of ethylurethane and water insufficient to form a solvent for a single one of said substances.

2. That method of preparing a medicinal solution which consists in mixing by weight

| | Parts by weight |
|---|---|
| Diethylbarbituric acid | 6 |
| Ethylurethane | 18 |
| Water | 6 | then mixing by weight

| | Parts by weight |
|---|---|
| Diallylbarbituric acid | 3 |
| Ethylurethane | 9 |
| Water | 3 | and then mixing the two mixtures.

3. That method of preparing a medicinal solution which consists in mixing by weight

| | Parts by weight |
|---|---|
| Diethylbarbituric acid | 15 |
| Diethyltetrabromoethanourea | 7 |
| Ethylurethane | 60 |
| Water | 18 |

4. That method of preparing a medicinal solution which consists in mixing by weight

| | Parts by weight |
|---|---|
| Diethylbarbituric acid | 10 |
| Diallylbarbituric acid | 10 |
| Phenylethylbarbituric acid | 10 |
| Ethylurethane | 54 |
| Water | 16 |

5. A solution of a mixture of several barbituric acid derivatives with a combination of urethanes and water in such proportions that the quantity of the urethane and water is insufficient to effect complete solution of any one of the barbituric acid derivatives composing the mixture, whereby the solution thus obtained is permanently stable, sterilizable and usable for medical purposes.

6. A solution of a mixture of diethylbarbituric acid and diallylbarbituric acid with a combination of ethylurethane and water in such proportions that the quantity of ethylurethane and water is insufficient to effect complete solution of the diethylbarbituric acid or the diallylbarbituric acid when unmixed, whereby the resulting solution is permanently stable, sterilizable and usable for medical purposes.

WERNER URSUM.